Figure 1:
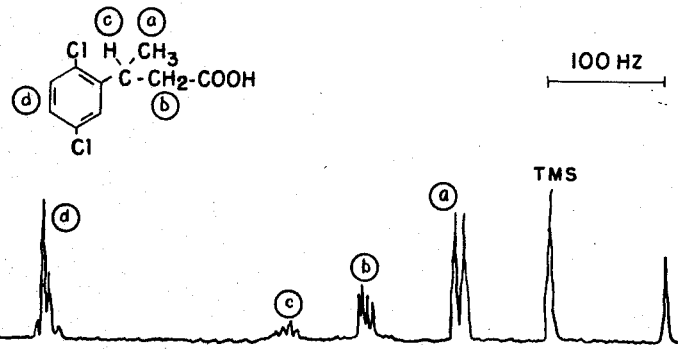
Figure 1:
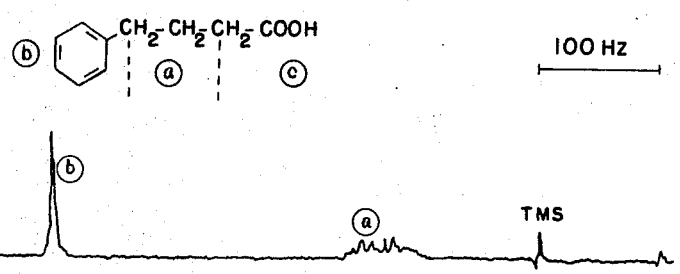

June 6, 1967  W. BRAUN ETAL  3,324,174
PRODUCTION OF 1,4-DIHALOBENZENE DERIVATIVES
Filed Dec. 26, 1963

INVENTORS:
WILLY BRAUN
MANFRED RUSKE
BY
ATT'YS

3,324,174
PRODUCTION OF 1,4-DIHALOBENZENE DERIVATIVES

Willy Braun, Heidelberg, and Manfred Ruske, Ludwigshafen (Rhine), Germany, assignors to Badische Anilin- & Soda - Fabrik Aktiengesellschaft, Ludwigshafen (Rhine), Germany
Filed Dec. 26, 1963, Ser. No. 333,345
Claims priority, application Germany, Dec. 29, 1962, B 70,161
3 Claims. (Cl. 260—515)

This invention relates to a new process for the production of 1,4-dihalobenzene derivatives having the general formula:

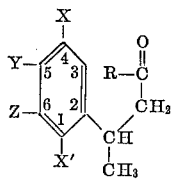

in which the radical X denotes a fluorine atom, a chlorine atom or a bromine atom, the radical X' denotes a fluorine atom, a chlorine atom or a bromine atom, Y denotes a hydrogen atom, a chlorine atom, a bromine atom, a methyl group or an ethyl group, Z denotes a hydrogen atom, a chlorine atom or a bromine atom and R denotes a hydroxyl group or a single bond connected to the carbon atom in the 3-position of the benzene ring.

It is known that $\beta$-(2,5-dichlorophenyl)-butyric acid is obtained when p-chloroaniline is reacted in acetone with $\beta$-chloro-n-butyryl chloride, the resultant $\beta$-chlorobutyric acid (4-chloroanilide) is condensed in the presence of aluminum chloride to 2-keto-4-methyl-6-chloro-1,2,3,4-tetrahydroquinoline, the condensation product is hydrolyzed to $\beta$-(2-amino-5-chlorophenyl)-butyric acid and this acid is subjected to a Sandmeyer reaction. It is also known that $\beta$-(2,5-dichlorophenyl)-butyric acid can be cyclized via the acid chloride to 4,7-dichloro-1-methylindane-3-one (F. Mayer et al., Ber. 60, 861, Ber. 61, 1966). These troublesome syntheses are unsuitable for the industrial production of $\beta$-(2,5-dichlorophenyl)-butyric acid and 4,7-dichloro-1-methylindane-3-one.

We have now found that surprisingly 1,4-dihalobenzene derivatives having the above general formula can be advantageously obtained by heating $\gamma$-butyrolactone with at least the molar amount of 1,4-dichlorobenzene, 1-4-dibromobenzene, 1,4-fluorochlorobenzene, 1,2,4-trichlorobenzene, 2,5-dichlorofluorobenzene, 1,2,3,4,-tetrachlorobenzene, 2,5-dichlorotoluene or 1,5-dichloroethylbenzene in the presence of at least the molar amount of anhydrous aluminum chloride to a temperature between the melting point of the 1,4-dihalobenzene derivative used and about 150° C.

In the process according to this invention, $\gamma$-butyrolactone is heated with a molar amount or more than a molar amount, for example 1.5 to 2.5 moles, of one of the said 1,4-dihalobenzene derivatives and in the presence of a molar amount or more than a molar amount (with reference to the $\gamma$-butyrolactone used) of anhydrous aluminum chloride as a condensing agent. The minimum molar ratio is advisable for technical reasons because the use of lesser amounts of 1,4-dihalobenzene or aluminum chloride makes the yields uneconomical. The process is carried out at temperatures which are above the melting point of the 1,4-dihalobenzene and do not exceed 150° C. Higher temperatures are possible, but do not usually offer any advantage.

By the process according to this invention, $\beta$-(2,5-dihalophenyl)-butyric acid is primarily formed and this is cyclized under the conditions of the process to 4,7-dihalo-1-methylindane-3-one. The process may be carried out under mild conditions and $\beta$-(2,5-dihalophenyl)-butyric acid may be isolated from the reaction mixture as the main product. By mild conditions we mean for example that the anhydrous aluminum chloride is used in molar or slightly more than molar amounts, such as 1.2 to 1.8 moles, and temperatures are chosen which do not exceed 80° C. By the nature of the reaction, even under these mild conditions, small amounts of 4,7-dihalo-1-methylindane-3-one are formed. It is possible to isolate 4,7-dihalo-1-methylindane-3-one as the sole reaction product however by using more drastic reaction conditions, i.e. by using anhydrous aluminum chloride for example in 1.5 to 3 times the molar amount and temperatures between 80° and 150° C. preferably 100° to 130° C.

In general a reaction period of three to eight hours is required for the reaction to 4,7-dihalo-1-methylindane-3-one. The course of the reaction and its termination may easily be observed by the development of hydrochloric acid.

To isolate $\beta$-(2,5-dihalophenyl)-butyric acid, the reaction mixture is split up with hot dilute hydrochloric acid and the organic phase sparated cold after solidification. $\beta$-(2,5-dihalophenyl)-butyric acid is dissolved out from the excess $\beta$-dihalobenzene with dilute alkali solutions, such as sodium bicarbonate solution, sodium carbonate solution or dilute caustic soda solution and then precipitated by acidification. It can easily be freed from water and dried. To isolate 4,7-dihalo-1-methylindane-3-one, the reaction mixture is split up with water and the organic phase is separated. The 4,7-dihalo-1-methylindane-3-one may be freed from excess dihalobenzene by steam distillation or vacuum distillation.

It must be regarded as surprising that 1,4-dihalobenzenes should be able to react with $\gamma$-butyrolactone in the presence of anhydrous aluminum chloride because it is known that 1,4-diahalobenzenes are not susceptible to condensations under the action of aluminum chloride or only slightly. Moreover, the reaction by the process of the present invention takes an unexpected course. Thus if $\gamma$-arylbutyric acids are formed by the prior art reaction of $\gamma$-butyrolactone with benzene, chlorobenzene, toluene or ethylbenzene (Reppe et al., Annalen 596, 219–220), the $\beta$-(2,5-dichlorophenyl)-butyric acids are formed by this process. It is also surprising that 4,7-dihalo-1-methylindane-3-one and not 5,8-dichloro-$\alpha$-tetralone is isolated as the reaction product of 1,4-dihalobenzene and $\gamma$-butyrolactone, as would have been expected in view of the prior art reaction of $\gamma$-butyrolactone with benzene (W. E. Truce, C. E. Olson, J. Amer. Chem. Soc., 74, 4721).

The $\beta$-(2,5-dihalophenyl)-butyric acids and 4,7-dihalo-1-methylindane-3-ones obtainable by the process according to this invention are valuable intermediate products, for example for the production of dyes.

The invention is further illustrated by the following examples in which all parts are parts by weight.

*Example 1*

200 parts of anhydrous aluminum chloride is introduced in portions in the course of 90 minutes at 70° to 75° C. into a melt of 294 parts of p-dichlorobenzene and 86 parts of $\gamma$-butyrolactone while stirring, and the temperature is kept for about eight hours at 75° C. The melt is then precipitated in hot dilute hydrochloric acid and the residue is suction filtered, washed with cold dilute hydrochloric acid and pressed out well. The suction filter cake is introduced into 6000 to 8000 parts of 5 to 10% sodium carbonate solution, stirred well and suction filtered. The clear filtrate is acidified. The $\beta$-(2,5-dichlorophenyl)-butyric acid, which is oily at first, solidifies in cold water. It is suction filtered, washed with cold water and dried at 60% C. in vacuo. About 163 parts of β-(2,5-dichlorophenyl)-butyric acid (70% of the theory) is obtained; its melting point is 70° to 71° C. The nuclear resonance spectrum, shown in FIGURE 1 of the accompanying drawings, confirms the specified constitution. Nuclear resonance is measured in the Varian spectrometer HR 60 in a 10% solution in CDCl₃ at 60 megacycles.

The residue which is insoluble in sodium carbonate solution contains mainly p-dichlorobenzene and about 39 parts of 4,7-dichloro-1-methylindane-3-one.

With the same mixture at a temperature of 80° to 85° C., only 54 to 55% of the theory of β-(2,5-dichlorophenyl)-butyric acid and 35 to 36% of 4,7-dichloro-1-methylindane-3-one are obtained is eight hours.

By working for example with p-fluorochlorobenzene instead of with p-dichlorobenzene, about the same yield of β-(1,4-fluorochlorophenyl)-butyric acid is obtained.

*Example 2*

Figure 2:
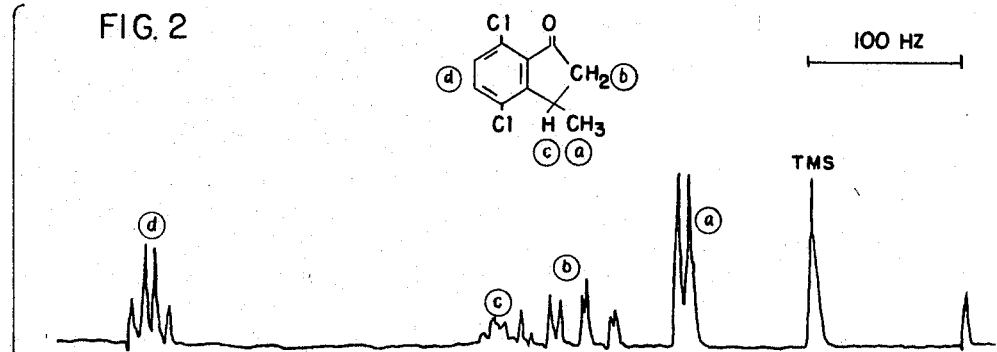
Figure 2:
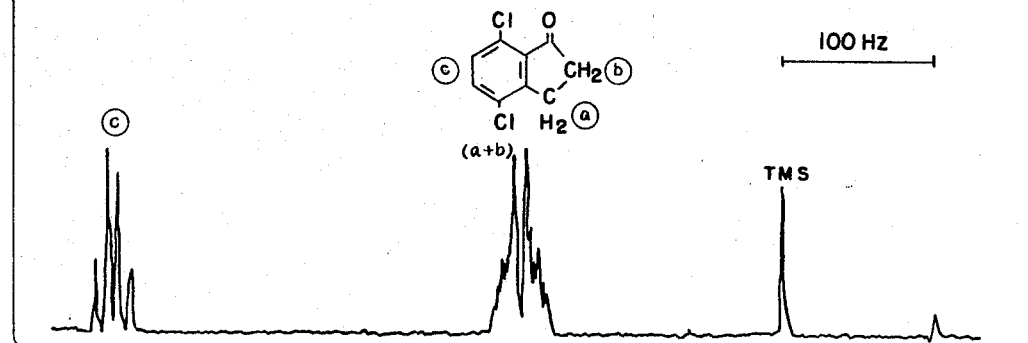

998 parts of anhydrous aluminum chloride is introduced into a melt of 1470 parts of p-dichlorobenzene and then 430 parts of γ-butyrolactone is dripped in in one to one and one half hours at 80° to 95° C. while stirring. The temperature is then raised to 100° to 110° C. and 665 parts of aluminum chloride is added in portions within an hour, the mixture is heated to 125° C. and kept at a temperature of 125° to 128° C. for four to six hours until all disengagement of acid has stopped. The melt is cooled to about 110° C., precipitated with ice-water containing hydrochloric acid while stirring and the residue is suction filtered cold, washed with cold water and pressed out well. The residue is fused in a distillation apparatus, and the water and excess p-dichlorobenzene distilled under subatmospheric pressure. 896 parts of 4,7-dichloro-1-methylindane-3-one (83.4% of the theory with reference to γ-butyrolactone) passes over at about 110° C. and 0.5 mm. Hg. This has a melting point of 100° to 101° C. The nuclear resonance spectrum, given in FIGURE 2 of the accompanying drawings, confirms the specified constitution. Nuclear resonance is measured in a 20% solution as specified in Example 1.

If the excess p-dichlorobenzene is not distilled off by vacuum distillation but by steam distillation, 970 parts (90.4% of the theory) of a somewhat yellowish colored crude product having a melting point of 92° to 96° C. is obtained after suction filtration and drying at 70° to 75° C.

*Example 3*

2244 parts of anhydrous aluminum chloride is added in portions while stirring to a melt of 1950 parts of p-dichlorobenzene at 70° to 80° C. and then 645 parts of γ-butyrolactone is dripped in at 90° to 110° C. in the course of two hours. The temperature is raised to 120° to 125° C. within about an hour in proportion to the vigorous disengagement of hydrogen chloride and the whole is stirred for about five hours at this temperature until the end of the evolution of hydrogen chloride, precipitated in ice-water while stirring, suction filtered while cold, washed with cold water and the residue freed substantially from water by squeezing. The moist product containing p-dichlorobenzene may if desired be further processed or it may be isolated as described in Example 1 when about 85 to 87% of the theory of 4,7-dichloro-1-methylindane-3-one is obtained.

*Example 4*

146.3 parts of anhydrous aluminum chloride is stirred into 130 parts of p-fluorochlorobenzene and then at 70° to 80° C. 43 parts of butyrolactone is dripped in within forty to sixty minutes, the temperature is raised to 125° C. within about two hours and kept at 120° to 130° C. for about three to five hours until disengagement of hydrogen chloride ceases. The melt is cooled and precipitated in water containing hydrochloric acid. The organic phase is separated after the water has settled, freed under subatmospheric pressure from moisture and excess p-fluorochlorobenzene and distilled at 93° C. and 0.22 mm. Hg. 73 parts of 4,7-fluorochloro-1-methylindane-3-one (73% of the theory) is obtained.

*Example 5*

40 parts of anhydrous aluminum chloride is added while stirring within the course of an hour to a mixture, heated to 80° to 90° C., of 88 parts of 1,4-dibromobenzene and 21.5 parts of γ-butyrolactone. The whole is heated to 100° C. and another 43 parts of anhydrous aluminum chloride is added. The reaction mixture is stirred for another two to four hours at 125° to 128° C., cooled and precipitated in water containing hydrochloric acid. About 57 parts of dibromo-1-methylindane-3-one passes over at 150° to 162° C. and 0.5 mm. as a pale yellow liquid.

We claim:

1. A process for the production of 1,4-dihalobenzene derivatives of the general formula

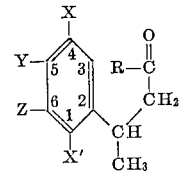

where X and X' stand for a halogen atom selected from the group consisting of fluorine, chlorine and bromine, Y stands for a radical selected from the group consisting of a hydrogen atom, a chlorine atom, a bromine atom, a methyl group and an ethyl group, Z stands for a radical selected from the group consisting of a hydrogen atom, a chlorine atom and a bromine atom and R stands for a member selected from the group consisting of HO— and a single bond connected to the carbon atom of the benzene ring in 3-position, which comprises heating γ-butyrolactone together with an at least molar amount of a 1,4-dihalobenzene derivative selected from the group consisting of 1,4-dichlorobenzene, 1,4-dibromobenzene, 1,4-fluorochlorobenzene, 1,2,4-trichlorobenzene 2,5-dichlorofluorobenzene, 1,2,3,4-tetrachlorobenzene, 2,5-dichlorotoluol and 2,5-dichloroethylbenzene in the presence of an at least molar amount of anhydrous aluminum chloride to temperatures from the melting point of the 1,4-dihalobenzene derivative to about 150° C.

2. A process for the production of a compound having the formula

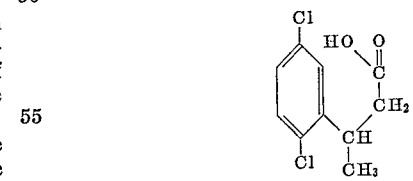

which comprises heating γ-butyrolactone together with an about molar amount of 1,4-dichlorobenzene in the presence of about a molar to 1.8-molar amount of anhydrous aluminum chloride to temperatures from about the melting point of 1,4-dichlorobenzene to 80° C.

3. A process for the production of the compound having the formula

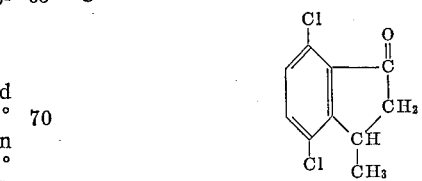

which comprises heating γ-butyrolactone together with an about molar amount of 1,4-dichlorobenzene in the presence of about a 1.5- to 3-molar amount of anhydrous aluminum chloride to temperatures from about 80° to 150° C.

References Cited

UNITED STATES PATENTS 2,587,540   2/1952   Shaver _____ 260—515

FOREIGN PATENTS 912,093   5/1954   Germany.

LORRAINE A. WEINBERGER, *Primary Examiner.*

KAREN ROSE, *Assistant Examiner.*